United States Patent [19]
Bundy

[11] 3,783,360
[45] Jan. 1, 1974

[54] ELECTRIC MOTOR SPEED CONTROL SYSTEMS

[75] Inventor: John E. Bundy, Churchover, near Rugby, England

[73] Assignee: Dunlop Limited, London, England

[22] Filed: May 23, 1972

[21] Appl. No.: 256,183

[30] Foreign Application Priority Data
May 28, 1971 Great Britain................... 18,079/71

[52] U.S. Cl................................. 318/327, 318/341
[51] Int. Cl............................................ H02p 5/16
[58] Field of Search .....................................
318/326-328, 331, 341, 308, 314

[56] References Cited
UNITED STATES PATENTS

| | | | |
|---|---|---|---|
| 3,604,996 | 9/1971 | Lutz.................................... | 318/331 |
| 3,543,115 | 11/1970 | Grygera............................. | 318/327 |
| 3,553,555 | 1/1971 | Morris................................ | 318/314 |
| 3,630,304 | 12/1971 | Sahinkaya.......................... | 318/327 |

Primary Examiner—Bernard A. Gilheany
Assistant Examiner—Thomas Langer
Attorney—Richard K. Stevens et al.

[57] ABSTRACT

A control system, for maintaining an electric motor at a required speed of rotation irrespective of the externally applied load, in which a command input provides a voltage proportional to the desired speed and direction of rotation of the motor and a switching circuit supplies current to the motor as a series of current pulses of constant frequency. The switching circuit is arranged to vary the duration of the pulses of current applied to the motor in response to input signals received from the command input and two negative feed back loops, one feed back loop being arranged to feed back a voltage dependent on the actual velocity of the motor and the other on the acceleration of the motor, of which the following is a Specification.

11 Claims, 16 Drawing Figures

ELECTRIC MOTOR SPEED CONTROL SYSTEMS

This invention relates to d.c. electric motor speed control systems and in particular to systems for the control of battery powered motors.

One object of the present invention is to provide a control system which will supply current to an electric motor as a series of current pulses and which will vary the duration of the current pulses supplied to the motor so as to tend to maintain the motor speed substantially constant at a selected speed of rotation irrespective of any externally applied motor load.

A control system in accordance with the present invention for maintaining an electric motor at a required speed of rotation comprises a command input means arranged to provide a voltage proportional to the desired speed and direction of rotation of the motor, an integrator arranged to receive the command input voltage as a signal input, a switching circuit arranged to receive the output of the integrator and to supply current to the motor as a series of current pulses of constant frequency, means to generate a voltage dependent on the actual speed of rotation of the motor, a first negative feed back loop arranged to feed back the motor velocity dependent voltage as a further signal input to the integrator, a second negative feed back loop arranged to differentiate the motor velocity dependent voltage so as to provide an acceleration dependent signal and to feed the acceleration dependent signal as an input to the switching circuit, the switching circuit being arranged to vary the duration of the pulses of current applied to the motor in response to the switching circuit inputs from the integrator and second feed back loop so as to tend to maintain the motor speed substantially constant at the required value irrespective of any externally applied motor load.

Two embodiments of the present invention will now be described by way of example with reference to FIGS. 1 to 16 of the accompanying drawings in which.

Figure 1:
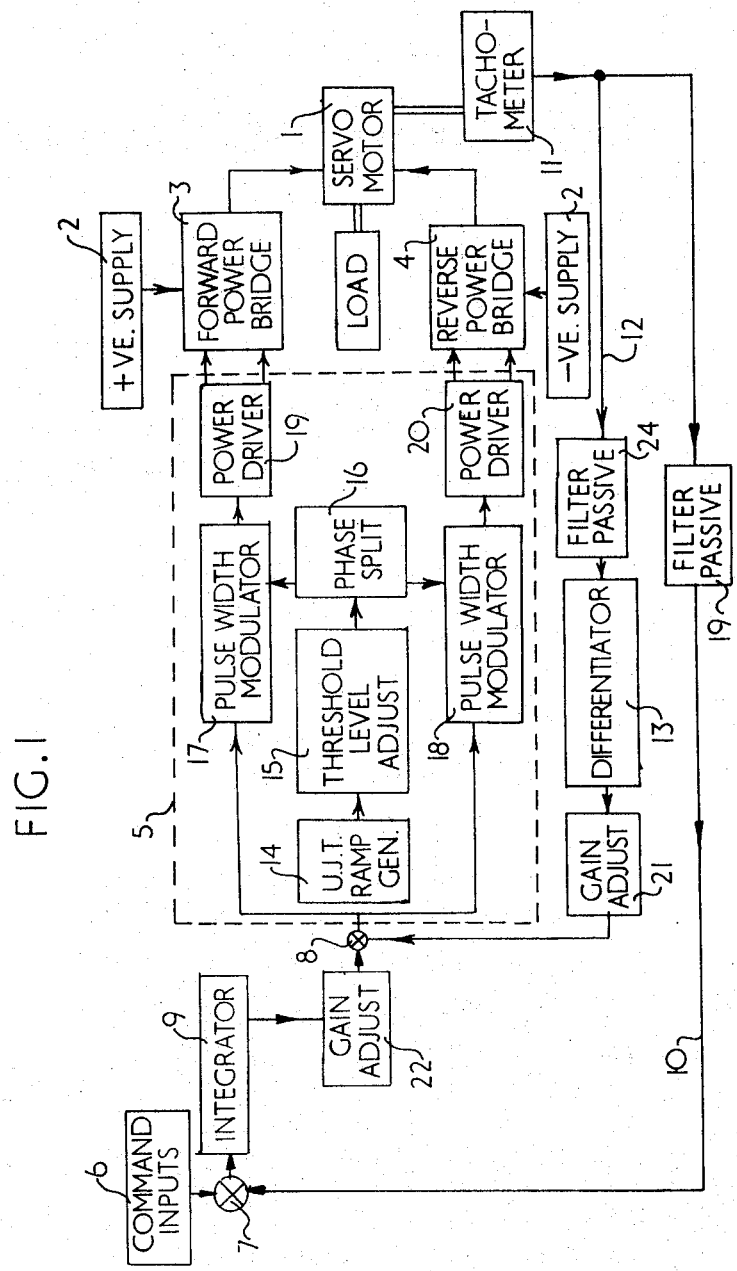
FIG. 1 is a block diagram representation of a control system in accordance with the present invention.
Figure 5:
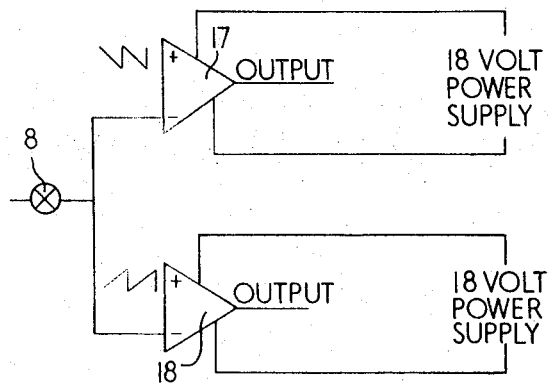
FIG. 5 is a diagrammatic representation of the manner in which the inputs are applied to the two pulse width modulators incorporated in the system shown in FIG. 1.
Figure 6:
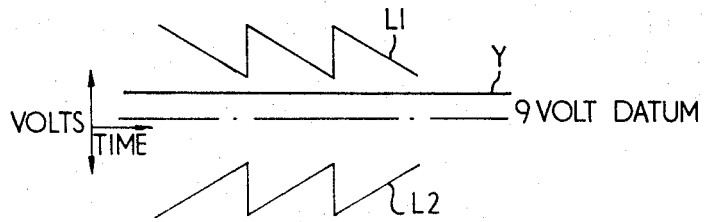
Figure 7:
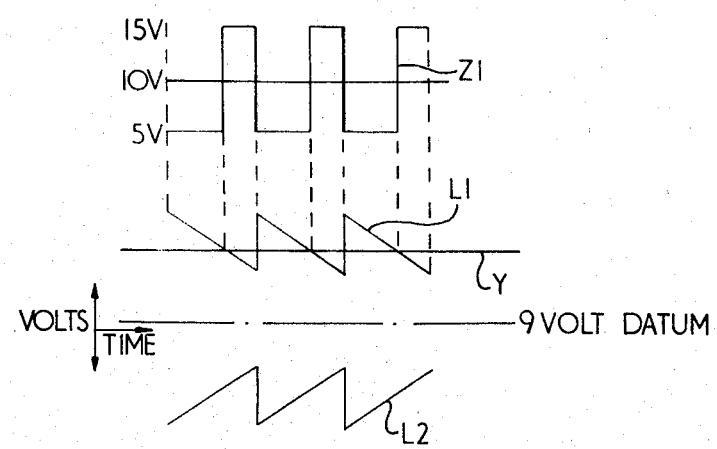
Figure 8:
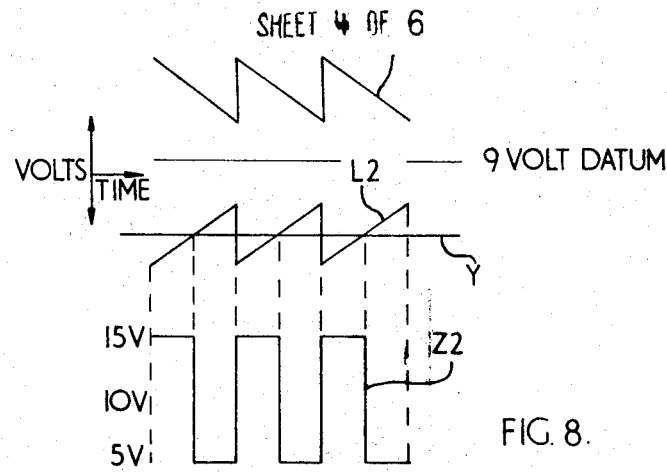
Figure 9:
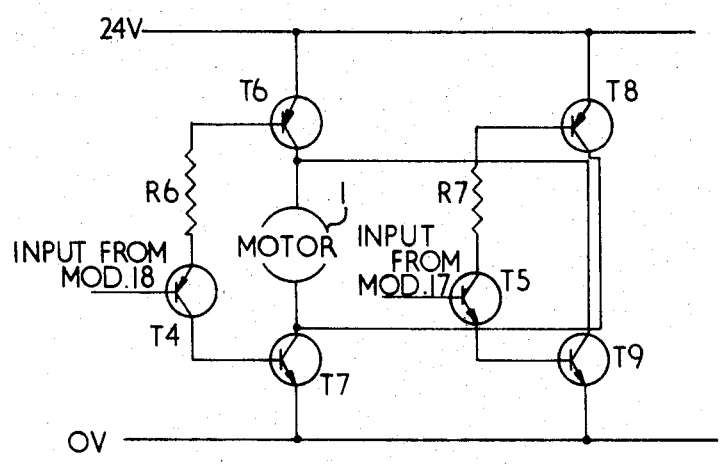
Figure 10:
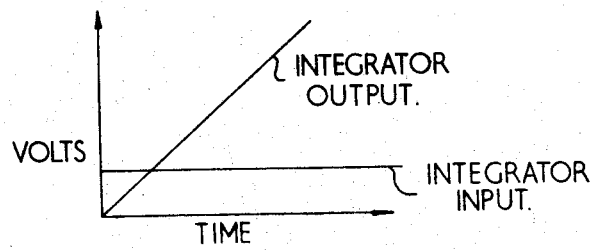
Figure 11:
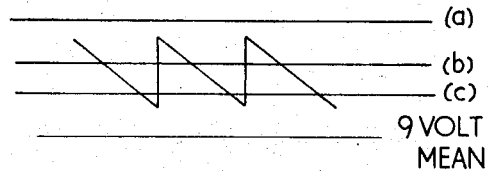
Figure 12:
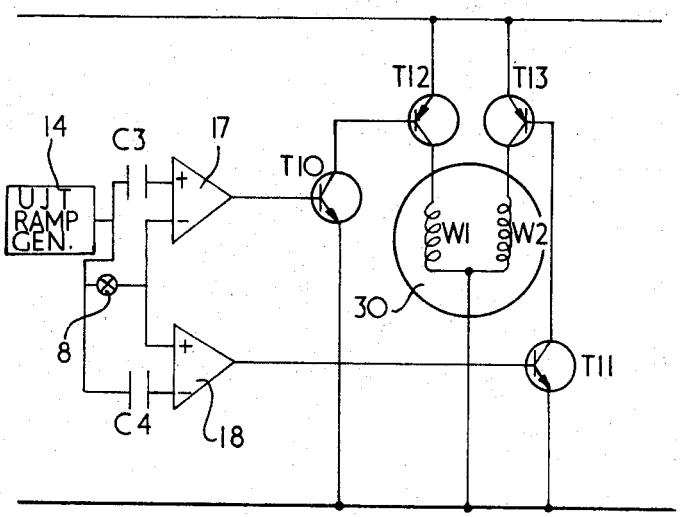
Figure 13:
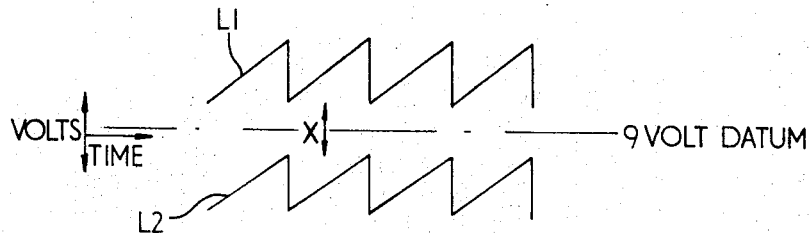

FIGS. 6 to 8 respectively show three possible input conditions to the pulse width modulators shown in FIG. 5;

FIG. 9 is a power bridge and driver circuit suitable for incorporation in the control system shown in FIG. 1;

FIG. 10 is a voltage/time plot of the output of the integrator used in the system shown in FIG. 1;

FIG. 11 shows the manner in which the input condition to the pulse width modulators varies during operation of the system;

FIG. 12 is an alternative form of switching and power driver circuit suiable for incorporation in the system shown in FIG. 1;

FIG. 13 is a voltage/time plot of the ramp generator inputs to the pulse width modulators shown in FIG. 12, and FIGS. 14 to 16 show three possible input conditions to the pulse width modulators shown in FIG. 12.

A motor speed control system in accordance with the present invention, as shown in FIG. 1, comprises a d.c. motor 1 driven from a d.c. battery supply 2 through two pairs of arms 3 and 4 of a transistorised power bridge circuit. One pair of arms 3 of the power bridge is arranged to control the current applied to the motor in the forward direction of rotation and the other pair of arms 4 is arranged to control the current applied to the motor in the reverse direction.

A switching circuit 5 is provided to control the supply of power to the motor through the power bridge, the switching circuit being arranged to switch the supply of power, through the appropriate arm of the bridge, on and off at a constant frequency so that the motor receives its power as a series of constant frequency pulses. By arranging the motor supply frequency to be too high for the motor to respond to the individual supply pulses the motor behaves as if it were provided with an equivalent continuous current supply.

The switching circuit contains a pulse width modulator and associated components, to be described, which vary the duration of the pulses of the motor supply thereby varying the effective mean current supplied to the motor and hence adjusting the torque output and speed of rotation of the motor.

Switching circuit 5 is controlled by a command input 6 which is connected to a source of d.c. voltage and which provides by means of potentiometers or switching networks a voltage input for the switching circuit which is proportional to the desired speed and direction of rotation of the motor 1. This command input voltage is fed through summing junctions 7 and 8, integrator 9 and gain adjuster 22 into switching circuit 5.

Typically command input 6 is arranged to operate in the voltage range defined by the limits of an 18 volt input to the switching circuit to correspond to the selection of maximum forward speed, a 9 volt input to correspond to the stationary (zero speed) condition, and a zero volt input to correspond to maximum reverse speed selection.

A negative feed back loop 10 incorporating a passive filter 19 feeds a voltage output from a d.c. tachogenerator 11, driven by motor 1, into summing junction 7. Feed back loop 10 thus provides a voltage signal proportional to the speed of rotation of motor 1 but of the opposite sign to the command input voltage to summing junction 7.

An additional negative feed back loop 12, including a differentiator 13, a passive filter 24 and gain adjuster 21, is provided from the tacho-generator 11 to the second summing junction 8. Loop 12 thus provides a voltage signal proportional to the acceleration of the motor and stabilises the motor at the selected speed preventing hunting, the signal obtained from loop 12 being arranged to oppose any change in the speed of the motor which causes the generation of an acceleration dependent signal in the loop 12.

The provision of integrator 9 automatically adjusts the corrective torque applied to the motor to rectify a given error in the selected speed. As the difference between the command input voltage to summing junction 7 and the voltage signal from feed back loop 10 is integrated, a voltage is fed into summing junction 8 which increases with time whilst the error in speed persists. Thus, as can be seen from FIG. 10, after a short period of time dependent on the circuit characteristics, the voltage fed into summing junction 8, and hence to the rest of the system, can far exceed the algebraic sum of the command and feed back loop voltages and hence applies a very much greater torque correction to the load then if no integrator were employed.

Switching circuit 5 comprises a uni-junction transistor ramp generator 14, a threshold level adjustment device 15, a phase splitter 16, and a pair of pulse width modulators 17 and 18 and power drivers 19 and 20.

Figure 2:
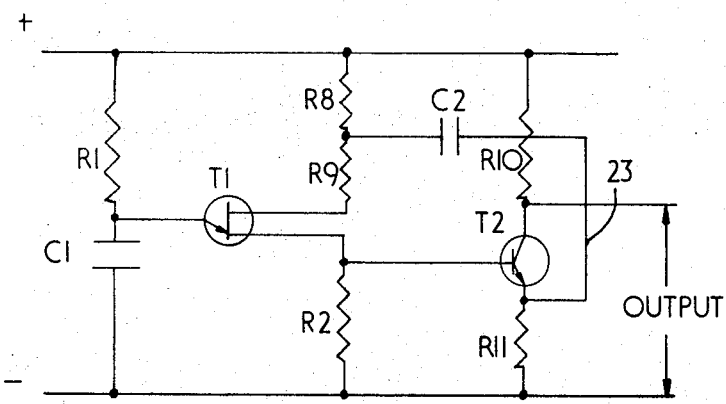
FIG. 2 is a ramp generator circuit suitable for incorporation in the control system shown in FIG. 1.

An example of a suitable ramp generator circuit is given in FIG. 2. In this circuit the charge on capacitor C1 builds up via resistor R1 until the voltage across C1 rises to the triggering level of uni-junction transistor T1 whereupon C1 is discharged through resistance R2 thus giving the basic saw-toothed wave form. The voltage developed across R2 as a result of the discharging of capacitor C1 drives N-P-N transistor T2 into conduction. Transistor T2 and associated resistors R8, R9, R10, R11 and feed back loop 23 incorporating capacitor C2 function as amplifying and linearising stages and by choice of appropriate relative values for these components the desired amplitude and linearity of the saw-toothed wave can be obtained.

Figure 3:
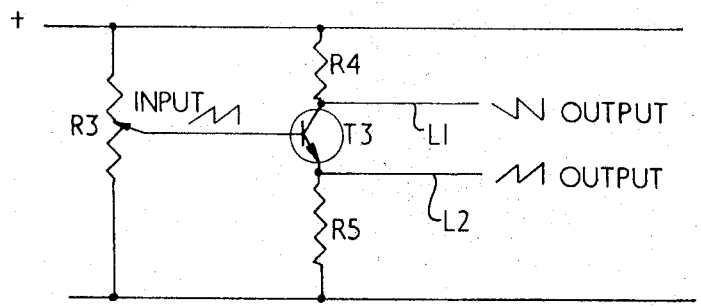
FIG. 3 is a phase splitter circuit suitable for incorporation in the control system shown in FIG. 1.

The saw-toothed output of ramp generator 14 is fed via a threshold level adjustment device 15 (in the form of a potentiometer R3) into a transistorised phase splitter 16 of the form shown in FIG. 3. The phase splitter comprises an N-P-N transistor T3 and resistors R4 and R5 in the collector and emitter lines respectively of T3. The output of the ramp generator is fed via R3 to the base of T3 and produces saw-toothed wave outputs at lines L1 and L2, 180° out of phase with one another, in the following manner. As the voltage at the base of T3 rises during a pulse of the saw-toothed input from the ramp generator, transistor T3 is rendered progressively more conducting and thus he proportion of the total potential drop across R4, T3 and R5 occurring across R4 increases thus progressively lowering the voltage at line L1, and similarly the proportion of the total potential drop across R4, T3 and R5 occurring across R5 increases thus progressively raising the voltage at line L2. The output wave forms at lines L1 and L2 are thus as shown in FIG. 3. By suitable choice of the relative values of R4 and R5 the magnitude of the wave form outputs at lines L1 and L2 can be made equal. Adjustment of potentiometer R3 allows alteration of the voltage range of the output at L1 relative to the voltage range of the output at L2, thereby altering the spacing X shown in FIG. 4. Assuming that an 18 volt supply is connected across R4, T3 and R5 the phase splitter is normally arranged to operate with the output at line L1 fluctuating through a given amplitude in the range 9 to 18 volts and the output at line L2 similarly fluctuating through a given amplitude in the range 0 to 9 volts (see FIG. 4).

The phase splitter output at line L1, together with the output signal from summing junction 8, is fed into a first pulse modulator 17 in the form of a high gain differential amplifier (see FIG. 5). Similarly the output at line L2 is fed, together with the output signal from summing junction 8, into a second pulse modulator 18 in the form of a second high gain differential amplifier. The output signals at lines L1 and L2 are fed into the positive or non-inverting inputs of amplifiers 17 and 18 and the output of summing junction 8 is fed into the negative or inverting inputs of amplifiers 17 and 18.

Amplifiers 17 and 18 are arranged to produce their maximum rated outputs, typically 15 volts, when their respective negative signal inputs exceeds their positive signal inputs and their minimum rated output, typically 5 volts, when their respective positive signal inputs exceed their negative signal inputs. These voltages represent a swing of ±5 volts about a 10 volt mean level.

Three possible combinations of inputs to amplifiers 17 and 18 are shown in FIGS. 6, 7 and 8 respectively.

FIG. 6 shows the output Y from summing junction 8 at a level which is always less than the positive input signal L1 to amplifier 17 and greater than the positive input L2 to amplifier 18. In this condition amplifier 17 continuously produces its minimum rated output and conversely amplifier 18 continuously produces its maximum rated output.

The outputs of amplifiers 17 and 18 are fed as base inputs to transistors T5 and T4 respectively of a power driver and bridge circuit of the form shown in FIG. 9. The power bridge circuit is typically driven by a 24 volt d.c. supply.

Transistors T4 and T5 operate as power driver or current amplifying stages for the two pairs of arms of the power bridge.

Transistors T6 and T7, controlled by transistor T4, constitute the pair of bridge arms controlling the current and hence torque applied to the motor in the reverse direction of rotation while transistors T8 and T9, controlled by transistor T5, constitute the pair of bridge arms controlling the current and hence torque applied to the motor in the forward direction of rotation.

By the choice of components of appropriate relative values and characteristics for the power driver and bridge circuit, P-N-P transistor T4 can be arranged to be non-conducting when modulator 18 supplies its maximum rated output and conducting when modulator 18 supplies its minimum rated output. Conversely N-P-N transistor T5 can be arranged to be non-conducting when modulator 17 supplies its minimum rated output and conducting when modulator 17 supplies its maximum rated output.

When transistors T4 and T5 are non-conducting the associated arms of the power bridge are also arranged to be non-conducting. Conversely each pair of arms of the power bridge is arranged to conduct when their associated power driver transistor T4 and T5 is rendered conducting. Thus when the signal inputs to the amplifiers are as shown in FIG. 6 neither pair of arms of the power bridge supplies current to the motor.

If we now consider the modulator input condition shown in FIG. 7 the signal inputs to amplifier 18 are the same as shown in FIG. 6, that is the negative signal input Y from summing junction 8 is continuously greater than the positive phase splitter input at line L2 and thus transistor T4 is again rendered non-conducting.

Considering the signal inputs to amplifier 17 it can be seen that during the first portion of each wave pulse of the phase splitter signal input the positive phase splitter input L1 to amplifier 17 is greater than the negative summing junction signal input Y to amplifier 17, whereas during the remainder of each wave pulse the summing junction signal input Y exceeds the phase splitter signal input. Thus during the first portion of each phase splitter input signal pulse width amplifier 17 conducts its minimum rated output, while during the remainder of each pulse the amplifier conducts its maximum rated output as shown in FIG. 7. As the square wave output Z1 from amplifier 17 is fed to the base of N-P-N power driver transistor T3 the transistor is rendered non-conducting whenever the base is supplied with the minimum rated output of amplifier 17 and conducting whenever the base is supplied with the maximum rated output. Thus the associated power bridge transistors T8 and T9 supply current to the motor whenever the base of transistor T5 is supplied with the maximum rated output of amplifier 17. This input signal condition results when the motor is being supplied with power to develop torque in the forward direction. The duration of the pulses of current supplied to the motor to develop torque in the forward direction thus depends upon the relative values of the signal inputs to amplifier 17. The phase splitter input remains constant once set while the input from summing junction 8 varies in response to the speed and acceleration error present in manner to be explained.

In the modulator input signal condition shown in FIG. 8 the signal inputs to amplifier 17 are the same as shown in FIG. 6, that is the positive input from the phase-splitter at line L1 is continuously greater than the negative signal input Y from summing junction 8, and thus transistor T5 is again rendered non-conducting.

The signal inputs to amplifier 18 are such that during the first portion of each wave pulse of the phase splitter signal input the negative signal input Y to amplifier 18 from summing junction 8 exceeds the positive phase splitter input L2 to amplifier 18, whereas during the remainder of each wave pulse the summing junction signal input is less than the phase splitter input. Thus during the first portion of each phase splitter input signal pulse amplifier 18 conducts its maximum rated output, while during the remainder of each pulse the amplifier conducts its minimum rated output, see square wave output Z2 of FIG. 8. Thus power driver transistor T4 and associated power bridge arm transistors T6 and T7 are rendered non-conducting when the base of transistor T4 is supplied with the maximum rated output of amplifier 18 and conducting when the base is supplied with the minimum ratedoutput of amplifier 18. rated output input signal condition results when the motor is being supplied with power to develop torque in the reverse direction. The duration of current pulses suplied to the motor to develop torque in the reverse direction thus depends upon the relative values of the signal inputs to amplifier 18.

Figure 4:
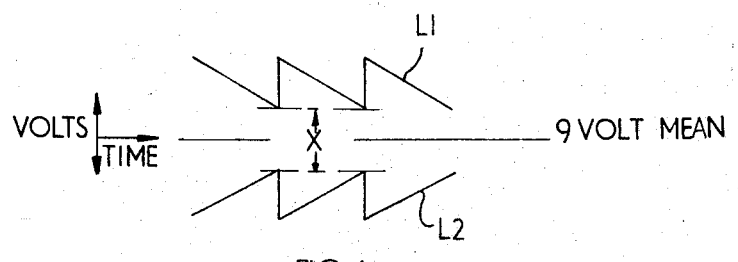
FIG. 4 is a voltage/time plot of the output of the phase splitter circuit shown in FIG. 3.

As will be appreciated from the above, the spacing X between the saw-toothed wave input signals to amplifiers 17 and 18, as shown in FIG. 4, determines dead band of operation of the control system, that is the deviation from the zero torque condition which can take place without the system operating to correct the deviation. The greater the spacing X the greater the deviation possible before the system becomes operative.

The system functions as follows:

If the motor is designed to have a maximum speed of say 17,000 rpm, which corresponds to a command input of 18 volts, and the operator selects maximum forward speed the command input 6 will supply 18 volts to summing junction 7. As soon as generator 11 starts to turn, feed back loop 10 will supply a voltage signal which will progressively increase as the motor speed increases. Initially the net output from summing junction 7 is virtually 18 volts as the voltage generated by the generator 11 will be extremely low, this passes through integrator 9 and gain adjuster 22 and is fed as a negative input signal into amplifiers 17 and 18 as previously described.

Depending on the amplitude and relative positioning of the saw-toothed wave form signal inputs to amplifiers 17 and 18 the output of summing junction 8 may initially be continuously greater than the saw-toothed input to amplifier 17 or may be greater than the saw-toothed input for only a portion of each saw-toothed input pulse, as shown in FIG. 11 at (a) and (b) respectively.

Thus power driver transistor T5 and the associated power bridge transistors T8 and T9 will either continuously conduct current to motor 1 or conduct current to the motor whenever the amplifier 17 is passing its maximum rated output as described above. As the speed of the motor rises to the selected value the negative feedback voltage in loop 10 increases and thus the output of summing junction 7 falls resulting in a progressively falling negative input to amplifiers 17 and 18 as shown at (c) in FIG. 11. Ideally the negative input to amplifiers 17 and 18 should fall until the input situation shown in FIG. 6 is reached whereupon no further power is supplied to the motor, but in practice when the motor is driving a resisting load it will be found necessary to apply a small forward torque to the motor to maintain a given selected forward speed.

If the external loading on the motor is increased instantaneously resulting in a loss of speed, the voltage signal in feedback loop 10 will drop accordingly producing a proportionate increase in the output of summing junction 7. Integrator 9 on seeing this error will start to integrate at a rate depending on the error magnitude such that the integrator output applied to summing junction 8 rapidly increases with time. As previously described this voltage level intersects the appropriate saw-toothed wave input and conducts further forward current and hence torque to the motor, accelerating it back towards the selected speed. As the speed increases the output of summing junction 7 decreases proportionately until finally when the selected speed is re-established, and the output of summing junction 7 has arrived at zero, the output of integrator 9 stops changing and remains at the new level corresponding to the additional torque required to sustain the increased load at the original selected speed.

If the external loading on the motor is decreased instantaneously resulting in a gain of speed, the voltage signal in feedback loop 10 will increase accordingly producing a proportionate decrease in the output of summing junction 7. Integrator 9 on seeing this error will start to integrate at a rate depending on the error magnitude such that the integrator output applied to summing junction 8 rapidly decreases with time. As previously described this voltage level intersects the appropriate saw-toothed wave input and conducts less forward current and hence torque to the motor, decelerating it back towards the selected speed. As the speed decreases the output of summing junction 7 increases proportionately until finally when the selected speed is re-established, and the output of summing junction 7 has arrived at zero, the output of integrator 9 stops changing and remains at the new level corresponding to the reduced torque required to sustain the increased load at the original selected speed.

The system operates n a similar manner whatever the selected speed. Command input 6 merely provides an input to summing junction 7 which is proportionate to the selected direction and speed of rotation of the motor, command inputs to summing junction 7 in the range 9 to 18 volts being arranged to initiate rotation in the forward direction of rotation, while inputs in the range 0 to 9 volts initiate rotation in the reverse direction. Thus the duration and effective sign of the current pulses supplied to the motor are constantly adjusted by the system so as to tend to maintain the motor substantially at the selected speed irrespective of the external load applied. As previously described the feedback loop 12 acts as a form of damping thus stabilising the motor and preventing the motor from hunting about the selected speed.

In an alternative form of control system in accordance with the present invention the switching and power driver circuits can be simplified, as shown in FIG. 12, as a result of utilising a split series motor 30.

In the following description of the alternative form of control system components identical to those previously described have been similarly numbered.

In the alternative control system the output Y of summing junction 8 is fed as a negative input to pulse width modulator 17 and as a positive input to pulse width modulator 18. The output of ramp generator 14 is coupled as a positive input via capacitor C3 to modulator 17 and as a negative input via capacitor C4 to modulator 18.

The inputs to modulators 17 and 18 from ramp generator 14 are separated by a clamping circuit (not shown) which biases the input L1 to modulator 17 at a level which is above the 9 volt datum and the input L2 to modulator 18 at a level which is below the 9 volt datum as shown in FIG. 13. The spacing X between the two saw-toothed wave forms is adjusted to give the required dead band of operation of the system.

As previously stated the alternative form of control system utilises a split series motor. The field (or armature) winding of such motors as either a single coil split into two portions, one arranged to drive the motor in the forward direction the other in the reverse direction, or alternatively either the field or armature winding is in the form of two oppositely wound coils, one again arranged to drive the motor in the forward direction and the other in the reverse direction.

The various alternative arrangements discussed above are represented in FIG. 12 by windings W1 and W2 which represent either two portions of a single coil field or armature winding of the motor or alternatively two oppositely wound coils constituting the field or armature winding of the motor.

The outputs of modulators 17 and 18 are fed as base inputs to power driver transistors T10 and T11 respectively which act as current amplifying stages for the two windings W1 and W2 of the split series motor 30. Winding W1 under the control of switching transistor T12 and power driver T10 is arranged to drive the motor in the forward direction of rotation while winding W2 under the control of switching transistor T13 and power driven T11 is arranged to drive the motor in the reverse direction of rotation.

By the choice of components of appropriate relative values and characteristics N-P-N transistors T10 and T11 can be arranged to be non-conducting when their respective modulators 17 and 18 supply their minimum rated outputs and conducting when the modulators supply their maximum rated outputs.

Figure 14:
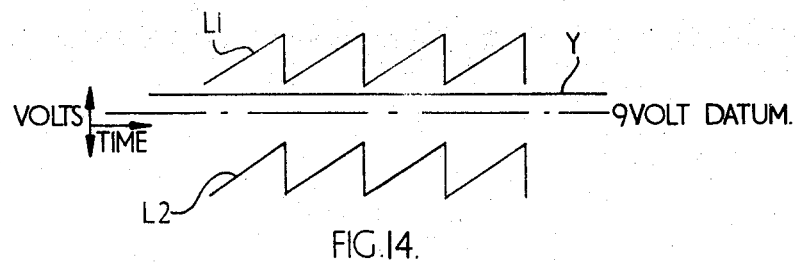
Figure 15:
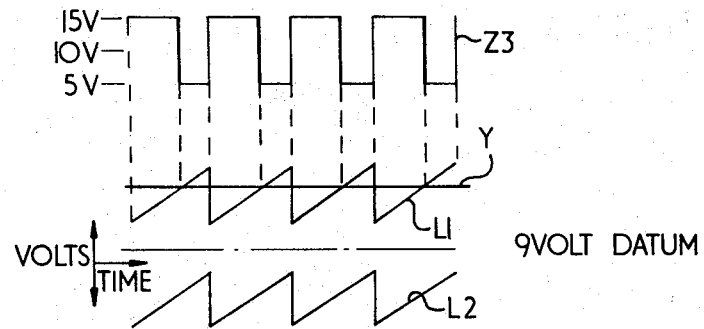
Figure 16:
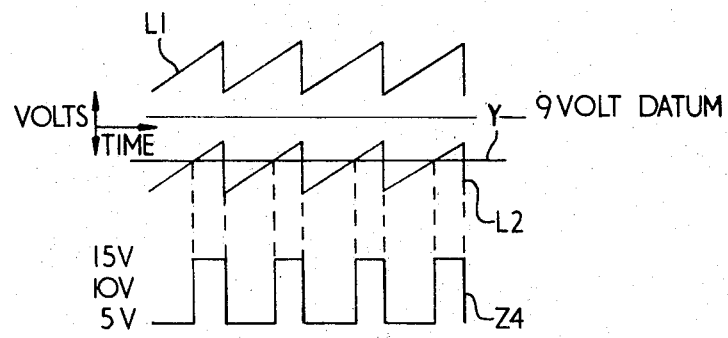

Three possible combinations of inputs to modulators 17 and 18 are shown in FIGS. 14, 15 and 16.

FIG. 14 shows the output Y from summing junction 8 at a level which is always less than the positive input L1 to modulator 17 and greater than the negative input L2 to modulator 18. In this condition modulators 17 and 18 both continuously produce their minimum rated outputs and associated power driver transistors T10 and T11 are thus rendered non-conducting. Thus no power is supplied to the motor.

If we now consider the modulator input situation shown in FIG. 15 the inputs to amplifier 18 are the same as shown in FIG. 14, that is the positive input 7 from summing junction 8 is continuously greater than the negative input L2 and thus transistor T11 is again rendered non-conducting.

Considering the inputs to amplifier 17 it can be seen that during the first portion of each wave pulse of the ramp generator the negative input Y from summing junction 8 exceeds the positive input L1 and hence the amplifier 17 conducts its maximum rated output. Conversely during the remainder of each wave pulse the positive input L1 exceeds the negative input Y and hence the amplifier 17 conducts its minimum rated output. As the square wave output Z3 from amplifier 17 is fed to the base of power driver transistor T10 the transistor therefore conducts whenever the amplifier is giving its maximum rated output and remains non-conductive whenever the amplifier is giving its minimum rated output. The associated P-N-P switching transistor T12 is rendered conducting when power driver T10 conducts, thus supplying power to the motor winding W1 to drive the motor in the forward direction.

A consideration of the modulator input situation shown in FIG. 16 shows that the inputs to amplifier 17 are the same as shown in FIG. 14, that is the positive input L1 is continuously greater than the negative input Y from summing junction 8 and thus transistor T10 is again rendered non-conducting.

During the first portion of each wave pulse of the ramp generator the positive input Y to amplifier 17 from summing junction 8 exceeds the negative input L2 and hence the amplifier conducts its minimum rated output. Conversely during the remainder of each wave pulse the negative input L2 exceeds the positive input Y and hence the amplifier 18 conducts its maximum rated output. As the square wave output Z4 from amplifier 17 is fed to the base of power driver transistor T11 the transistor therefore conducts whenever the amplifier is giving its maximum rated output and remains non-conductive whenever the amplifier is giving its minimum rated output. The associated P-N-P switching transistor T13 is rendered conducting when power driver T10 conducts, thus supplying power to the motor winding W2 to drive the motor in the reverse direction.

The alternative system described above thus varies the power supplied to the motor in accordance with the relative values of the positive and negative inputs to modulators 17 and 18 thereby again maintaining the selected motor speed irrespective of the external load applied.

As a result of utilising a split series motor the need for a phase splitter to give two saw-toothed waves 180 degrees out of phase is eliminated as is the need for the power bridge circuit shown in FIG. 9. This simplifies the system and increases its reliability at the cost of marginal loss of motor performance.

The systems described above, which have many practical applications in the control of d.c. powered vehicles and devices, are capable of delivering full driving current, and hence maximum output torque, at any speed. The actual output torque of the motor at any speed is therefore limited only by the power rating of the motor.

I claim:

1. A control system for maintaining an electric motor at a required speed of rotation comprising a command input means arranged to provide a voltage proportional to the desired speed and direction of rotation of the motor, an integrator arranged to receive the command input voltage as a signal input, a switching cicuit arranged to receive the output of the integrator and to supply current to the motor as a series of current pulses of constant frequency, means to generate a voltage dependent on the actual speed of rotation of the motor, a first negative feed back loop arranged to feed back the motor velocity dependent voltage as a further signal input to the integrator, a second negative feed back loop arranged to differentiate the motor velocity dependent voltage so as to provide an acceleration dependent signal and to feed the acceleration dependent signal as an input to the switching circuit, the switching circuit being arranged to vary the duration of the pulses of current applied to the motor in response to the switching circuit inputs from the integrator and second feed back loop so as to tend to maintain the motor speed substantially constant at the required value irrespective of any externally applied motor load.

2. A control system according to claim 1 wherein power is supplied to the motor through a two arm power bridge circuit, one arm of the power bridge circuit controlling the current supplied to the motor in the forward direction of rotation and the other arm controlling the current supplied to the motor in the reverse direction of rotation, the switching circuit being arranged to switch the power through the appropriate arm of the bridge and to vary the duration of the constant frequency current pulses supplied to the motor via the power bridge circuit.

3. A control system according to claim 2 wherein the switching circuit comprises a ramp generator arranged to produce a constant frequency saw-toothed wave form, a phase splitter arranged to produce two sawtoothed wave outputs 180 degrees out of phase with one another and two pulse width modulators in the form of differential amplifiers, one pulse width modulator being arranged to receive one of the phase splitter outputs as a positive input and the other pulse width modulator being arranged to receive the other phase splitter output as a positive input, both pulse width modulators being arranged to receive, as a combined negative input, the signals from the integrator and the second negative feed back loop, the output of one modulator being arranged to control the supply of power to the motor through one arm of the power bridge circuit and the output of the other modulator being arranged to control the supply of power through the other arm of the power bridge circuit.

4. A control system according to claim 3 wherein one pulse width modulator is arranged to switch on the power to the motor via one arm of the power bridge circuit when the modulators positive input exceeds its negative input and the other pulse width modulator is arranged to switch on the power to the motor via the other arm of the power bridge circuit when the negative input of the other modulator exceeds its positive input.

5. A control system according to claim 4 wherein the output of one pulse width modulator is connected to the base of a N-P-N transistor which controls the supply of power to one arm of the power bridge circuit and is arranged to render the N-P-N transistor conductive when the negative input of the pulse width modulator exceeds its positive input and the output of the other pulse width mpdulator is connected to the base of a P-N-P transistor which controls the supply of power to the other arm of the power bridge circuit and is arranged to render the P-N-P transistor conductive when the positive input of the other pulse width modulator exceeds its negative input.

6. A control system according to claim 1 wherein a split series electric motor is employed; the field or armature winding of the motor comprising a single coil split into two portions, the switching circuit being arranged to supply current to one portion of the field or armature winding to drive the motor in the forward direction of rotation and to allow a portion of the winding to drive the motor in the reverse direction.

7. A control system according to claim 6 wherein the switching circuit comprises a ramp generator arranged to produce a constant frequency saw-toothed wave form and two pulse width modulators in the form of differential amplifiers, one pulse width modulator being arranged to receive the ramp generator output as a positive capacitance-coupled input and the signals from the integrator and second negative feed back loop as a combined negative input, the other pulse width modulator being arranged to receive the ramp generator output as a negative capacitance-coupled input and the signals from the integrator and second negative feed back loop as a combined positive input, the positive ramp generator input to the one modulator being biased to a higher voltage level than the negative ramp generator input to the other modulator, the output of one modulator being arranged to control the supply of current to one portion of the field or armature winding and the output of the other modulator being arranged to control the supply of current to the other portion of the winding.

8. A control system according to claim 7 wherein the outputs of both modulators are respectively connected to the base contacts of two separate N-P-N transistors, each respective N-P-N transistor being arranged to be conductive, thereby supplying current to the associated oppositely wound coil, or portion of the field or armature winding of the motor, whenever the negative input to that particular modulator exceeds its positive input.

9. A control system according to claim 1 wherein a split series motor is employed, the field or armature winding of the motor comprising two oppositely wound coils, the switching circuit being arranged to supply current to one of the oppositely wound coils to drive the motor in the forward direction of rotation and to the other oppositely wound coil to drive the motor in the reverse direction.

10. A control system according to claim 9 wherein the switching circuit comprises a ramp generator arranged to produce a constant frequency saw-toothed wave form and two pulse width modulators in the form of differential amplifiers, one pulse width modulator being arranged to receive the ramp generator output as a positive capacitance-coupled input and the signals from the integrator and second negative feed back loop as a combined negative input, the other pulse width modulator being arranged to receive the ramp generator output as a negative capacitance-coupled input and the signals from the integrator and second negative feed back loop as a combined positive input, the positive ramp generator input to the one modulator being biased to a higher voltage level than the negative ramp generator input to the other modulator, the output of one modulator being arranged to control the supply of current to one of the oppositely wound coils and the output of the other modulator being arranged to control the supply of current to the other oppositely wound coil.

11. A control system according to claim 10 wherein the outputs of both modulators are respectively connected to the base contacts of two separate N-P-N transistors, each respective N-P-N transistor being arranged to be conductive, thereby supplying current to the associated oppositely wound coil, or portion of the field or armature winding of the motor, whenever the negative input to that particular modulator exceeds its positive input.

* * * * *